United States Patent
Haaland et al.

(10) Patent No.: US 11,528,451 B2
(45) Date of Patent: Dec. 13, 2022

(54) VIDEO CONFERENCING SYSTEM

(71) Applicant: Eyecon AS, Stavanger (NO)

(72) Inventors: Jan Ove Haaland, Stavanger (NO); Eivind Nag, Stavanger (NO); Joar Vaage, Stavanger (NO)

(73) Assignee: EYECON AS, Stavanger (NO)

( * ) Notice: Subject to any disclaimer, the term of this patent is extended or adjusted under 35 U.S.C. 154(b) by 0 days.

(21) Appl. No.: 17/253,904

(22) PCT Filed: Jun. 18, 2019

(86) PCT No.: PCT/EP2019/066091
§ 371 (c)(1),
(2) Date: Dec. 18, 2020

(87) PCT Pub. No.: WO2019/243367
PCT Pub. Date: Dec. 26, 2019

(65) Prior Publication Data
US 2021/0274129 A1    Sep. 2, 2021

(30) Foreign Application Priority Data
Jun. 18, 2018 (GB) ..................... 1809960

(51) Int. Cl.
*H04N 7/15* (2006.01)
*G06T 7/00* (2017.01)
*G06T 17/20* (2006.01)

(52) U.S. Cl.
CPC ............. *H04N 7/157* (2013.01); *G06T 7/97* (2017.01); *G06T 17/20* (2013.01); *G06T 2207/10028* (2013.01)

(58) Field of Classification Search
CPC combination set(s) only.
See application file for complete search history.

(56) References Cited

U.S. PATENT DOCUMENTS

| 5,359,362 A | 10/1994 | Lewis et al. |
| 9,743,040 B1 | 8/2017 | Newstadt et al. |

(Continued)

FOREIGN PATENT DOCUMENTS

WO    2018/039071    3/2018

OTHER PUBLICATIONS

Kauff, P. et al., "An Immersive 3D Video-Conferencing System using Shared Virtual Team User Environments", *Proceedings of the 4th. International Conference on Collaborative Virtual Environments*, pp. 105-112, 2002.

(Continued)

*Primary Examiner* — Phung-Hoang J Nguyen
(74) *Attorney, Agent, or Firm* — Diederiks & Whitelaw, PLC.

(57) ABSTRACT

A method of capturing data for use in a video conference includes capturing data of a first party at a first location using an array of one or more video cameras and/or one or more sensors. The three-dimensional position(s) of one or more features represented in the data captured by the video camera(s) and/or sensor(s) are determined. A virtual camera positioned at a three-dimensional virtual camera position is defined. The three-dimensional position(s) determined for the feature(s) are transformed into a common coordinate system to form a single view of the feature(s) as appearing to have been captured from the virtual camera. The video image and/or sensor data of the feature(s) viewed from the perspective of the virtual camera and/or data representative of the transformed three-dimensional position(s) of the feature(s) are then transmitted or stored.

19 Claims, 8 Drawing Sheets

(56) References Cited

U.S. PATENT DOCUMENTS

| | | |
|---|---|---|
| 2003/0197779 A1* | 10/2003 | Zhang .................. H04N 7/144 |
| | | 348/14.09 |
| 2003/0231179 A1 | 12/2003 | Suzuki |
| 2005/0237376 A1 | 10/2005 | Roessler et al. |
| 2006/0244817 A1 | 11/2006 | Harville et al. |
| 2007/0236498 A1* | 10/2007 | Higuchi ............... G06T 11/206 |
| | | 345/441 |
| 2010/0123770 A1 | 5/2010 | Friel et al. |
| 2014/0098179 A1 | 4/2014 | Moore |
| 2014/0218467 A1 | 8/2014 | You et al. |
| 2015/0195443 A1 | 7/2015 | Dal Mutto et al. |
| 2017/0127023 A1 | 5/2017 | High et al. |

OTHER PUBLICATIONS

Waizenegger, W. et al., "Model based 3D gaze estimation for provision of virtual eye contact", *Image Processing (ICIP)*, pp. 1973-1976, 2012.

Xinzhong, L. et al., "An Immersive Telepresence System Using RGB-D Sensors and Head Mounted Display", *IEEE International Symposium on Multimedia (ISM)*, pp. 453-458, 2015.

Zhou, X. et al., "New Eye Contact Correction Using Radial Basis Function for Wide Baseline Videoconference System", *Advances in Multimedia Information Processing PCM* 2012, pp. 68-79, 2012.

\* cited by examiner

VIDEO CONFERENCING SYSTEM

CROSS-REFERENCE TO RELATED APPLICATIONS

This application represents the U.S. National Phase of International Application number PCT/EP2019/066091 entitled "Video Conferencing System" filed 18 Jun. 2019, which claims benefit from Great Britain Application number 1809960.6 filed 18 Jun. 2018, all of which are incorporated herein by reference.

BACKGROUND OF THE INVENTION

This invention relates to a video conferencing system and a method of holding a video conferencing call, in particular to a video conferencing system that defines a virtual camera.

Video conferencing involves the exchange of audio and video data between multiple parties at different locations to facilitate audio and visual communication. While the inclusion of video data provides enhanced communication over a telephone call, video conferencing still does not provide the same experience as a face to face meeting.

One of the main problems is the lack of eye to eye contact between the participants involved in a video conference, which is an important part of human interaction. This is because, for each party, the images of the other participants involved in the video conference are shown on their screen but the video camera capturing the image data of this party is outside of the area of the screen.

SUMMARY OF THE INVENTION

It is an aim of the present invention to provide an improved video conferencing system.

When viewed from a first aspect the invention provides a method of capturing data for use in a video conference, the method comprising:
  capturing data of a first party at a first location using an array of one or more video cameras and/or one or more sensors;
  determining, for each of the one or more video cameras and/or each of the one or more sensors in the array, the three-dimensional position(s) of one or more features represented in the data captured by the video camera or sensor;
  defining a virtual camera positioned at a three-dimensional virtual camera position;
  transforming the three-dimensional position(s) determined for the feature(s) represented in the data into a common coordinate system to form a single view of the feature(s) as appearing to have been captured from the virtual camera using the video image data from the one or more video cameras and/or the data captured by the one or more sensors; and
  transmitting and/or storing the video image and/or sensor data of the feature(s) viewed from the perspective of the virtual camera and/or data representative of the transformed three-dimensional position(s) of the feature(s).

When viewed from a second aspect the invention provides a video conferencing system for capturing data for use in a video conference, the system comprising:
  an array of one or more video cameras and/or one or more sensors for capturing data of a first party at a first location; and
  processing circuitry configured to:
    determine, for each of the one or more video cameras and/or each of the one or more sensors in the array, the three-dimensional position(s) of one or more features represented in the data captured by the video camera or sensor;
    define a virtual camera positioned at a three-dimensional virtual camera position;
    transform the three-dimensional position(s) determined for the feature(s) represented in the data into a common coordinate system to form a single view of the feature(s) as appearing to have been captured from the virtual camera using the video image data from the one or more video cameras and/or the data captured by the one or more sensors; and
    transmit and/or store the video image and/or sensor data of the feature(s) as viewed from the perspective of the virtual camera and/or data representative of the transformed three-dimensional position(s) of the feature(s) to the one or more other parties.

The present invention provides a method of and a video conferencing system for capturing data for use in a video conference, e.g. for holding a video conference call between multiple parties at different locations (such as a call between a first party at a first location and one or more other parties at one or more remote locations respectively). The system includes an array of video camera(s) and/or sensor(s) that are used to capture data of a party at one of the locations. The array includes one or more video cameras and/or one or more sensors. The video camera(s) are arranged to capture video image data and the sensor(s) are arranged to capture respective other data, e.g. depending on the type of sensor being used.

The system also includes processing circuitry configured to process the captured data and transmit and/or store video image and/or sensor data or the three-dimensional position data, e.g. to the other party (or parties) at the other respective location(s).

After the data has been captured by the array of video camera(s) and/or sensor(s), for each of the video camera(s) and sensor(s) the processing circuitry processes the respective data to determine the three-dimensional positions of one or more features represented (e.g. shown) in the data. The three-dimensional positions are defined, for each video camera and sensor, e.g. in the coordinate system of the video camera or sensor that captured the data. Thus, for each of the video camera(s) and sensor(s), a set of three-dimensional positions are determined for the feature(s) captured in that camera or sensor's data.

A virtual camera is defined at a particular three-dimensional position. Using this three-dimensional virtual camera position, the determined three-dimensional position(s) of the feature(s) in the captured data are transformed into a common coordinate system.

The video image data and/or the sensor data of the feature(s), as captured from the one or more video cameras and/or the one or more sensors, is then used to form a single view of these feature(s) from the perspective of the virtual camera (i.e. as if the video image data had been captured by a video camera at the three-dimensional position of the virtual camera). The video image and/or sensor data from this perspective and/or the transformed three-dimensional position data is then transmitted (e.g. to the other parties involved in the video conference call) and/or stored (e.g. for future use).

It will be appreciated that by defining a virtual camera and using the video image data and/or the sensor data from the (actual) video camera(s) and/or sensors to form a single view, such that the transmitted and/or stored video image and/or sensor data (or the transformed three-dimensional position data) appears as if it has been captured by the virtual camera, this can provide a more engaging view of the party in the captured video image data to the party (or parties) at the remote location(s) that are viewing the transmitted and/or stored video image and/or sensor data from the perspective of the virtual camera. Thus the virtual camera may be positioned where it is not possible to place a physical camera (e.g. in the middle of a display screen, behind a wall or from the viewpoint of one of the participants).

For example, the position of the virtual camera can be chosen such that it appears as if the party in the transmitted and/or stored video image and/or sensor data is looking into the virtual camera, thus enabling eye-contact with the party (or parties) in the remote location(s) to be made. This helps to provide a video conference experience that is more akin to a face to face meeting, thus improving the human interaction.

The video conference call may be held between any suitable and desired number of parties, at respective different locations. The call may be between two parties at respective different locations, i.e. a one to one call. The call may be between the first party at one location and multiple different parties at multiple different locations respectively. In this latter set of embodiments, the video conference call may comprise a one to many call, i.e. video image data is exchanged between the first party and multiple different other parties, or the video conference call may comprise a many to many call, i.e. video image data is exchanged between the each of the parties involved in the call.

The array of one or more video cameras and/or one or more sensors may comprise any suitable and desired type and number of video cameras and/or sensors in order to capture video image data of the first party at the first location. In one embodiment, the one or more sensors (e.g. each) comprise one or more video cameras and thus the array of one or more video cameras and/or one or more sensors may comprise a plurality of video cameras. When the array comprises one or more sensors that are not video cameras, these one or more sensors may, for example, comprise one or more sensors arranged to capture data outside of the visual spectrum, e.g. infra-red radiation. The one or more sensors may comprise one or more time of flight sensors or any other type of sensor that may be used to determine the three-dimensional position of a feature in the captured data (e.g. LIDAR sensor(s), IR sensor(s), ultrasound sensor(s)). The sensor(s) and the video camera(s) may be packaged together in a single unit.

In one embodiment, the array of one or more video cameras and/or one or more sensors comprises three or more video cameras and/or sensors, e.g. four or more video cameras and/or sensors, e.g. six or more, e.g. ten or more. It will be appreciated that a greater number of video cameras and/or sensors helps to determine the three-dimensional positions of features more accurately and helps to create more accurate video image data from the perspective of the virtual camera, for transmission to the other parties involved in the video conference call and/or for storing the data. A greater number of video cameras and/or sensors may also enable greater flexibility for the range of positions that may be chosen for the virtual camera.

The array of one or more video cameras and/or one or more sensors may be arranged in any suitable and desired configuration. In one embodiment, the array of video camera(s) and/or sensor(s) is arranged around a perimeter of a display. Thus, preferably the video conferencing system comprises a display for displaying video image data of one or more remote parties involved in the video conference call to the party at the first location, and preferably, the array of video camera(s) and/or sensor(s) is arranged around the perimeter of the display.

The array of video camera(s) and/or sensor(s) may be arranged on a wall of a room in which at least part of the video conferencing system is located. The display may be arranged on the same or a different wall. The array of video camera(s) and/or sensor(s) may be arranged on a plurality of different walls and, e.g., the ceiling or the floor, in the room. Arranging the video camera(s) and/or sensor(s) on multiple different walls and, e.g., the ceiling, helps to increase the number of locations from and the solid angle over which data is captured. This allows greater flexibility in the choice of positions for the virtual camera and an increased quality of the transmitted and/or stored composite image that is able to be generated from the perspective of the virtual camera.

Once the video image and/or sensor data has been captured, the processing circuitry determines the three-dimensional positions of features represented in the data, for the data captured by each video camera and sensor. The positions are preferably determined in the coordinate system of the respective video camera or sensor. However, it will be appreciated that a different (e.g. reference) coordinate system may be used and the appropriate transformations applied.

The two-dimensional positions (in a plane perpendicular to the direction in which a video camera or sensor is directed) of the features may simply be determined using the two dimensional position of the feature in the frames of video image data and/or the other sensor data (e.g. using an appropriate transformation based on the view frustum of the video camera or sensor, taking into account the distance of the video camera or sensor from the feature).

The depth component of the three-dimensional positions of the features is preferably determined by determining the displacement between (e.g. by triangulating the positions of) the features using the video image data and/or the other sensor data from the array of video camera(s) and/or sensor(s), or by using other methods to determine the depth component. For example, features with less distance between them may be determined to have a greater depth than features with greater distance between them (e.g. for video camera(s) and/or sensor(s) that have axes which are parallel or otherwise aligned), e.g. exploiting the perspective in the captured data. Thus preferably the method comprises (and the processing circuitry is configured to) determining the depth component of the three-dimensional position(s) of the feature(s), e.g. using the two-dimensional (e.g. x-y) distance between features in the video image data and/or the other sensor data. Determining the three-dimensional positions of the features in the video image data and/or the sensor data enables a depth to be assigned to each of the features (e.g. along with their two-dimensional position in the frames of video image data). The three-dimensional positions may be stored as a depth map, a 3D point cloud, a 3D mesh or a depth buffer, for example.

In a preferred embodiment the method comprises (and the system is arranged to) calibrating the positions of the video camera(s) and/or the sensor(s) in the array. This helps to determine the positions of the video camera(s) and/or the sensor(s) in the array relative to each other and enables the positions of the features captured in the video image data and/or the other sensor data to be determined accurately (e.g. using triangulation). The video camera(s) and/or the sensor(s) may be calibrated using their (e.g. measured) positions and/or by capturing video image data or other sensor data of suitable features, e.g. positioned at known positions.

In some embodiments, the relative positions of the video camera(s) and/or the sensor(s) in the array may not be known, at least initially (e.g. before any calibration is performed). In other embodiments, however, the relative positions of the video camera(s) and/or the sensor(s) in the array may already be known (e.g. having been placed at predetermined locations). In the embodiments in which the relative positions between the video camera(s) and/or the sensor(s) in the array may not be known, preferably the method comprises (and the system is arranged to) calibrating the positions of the video camera(s) and/or the sensor(s) in the array. This may be done by performing one or more steps of the method (e.g. determining the three-dimensional position(s) of one or more features represented in the data captured by the video camera(s) and/or the sensor(s) in the array) to determine the relative positions of the video camera(s) and/or the sensor(s) in the array. One or more calibration passes may be performed, to determine the positions of the video camera(s) and/or the sensor(s) in the array. Following this, the method may simply use the calibrated positions to help determine the positions of features identified in the captured data.

Preferably the method comprises (and the processing circuitry is configured to) identifying features in the video image data and/or the other sensor data, e.g. contained in the entire three-dimensional representation of the scene. The features are preferably each assigned a respective three-dimensional position. The features may, for example, be discrete features (such as people and pieces of furniture, or sub-components thereof) or may be defined in a more abstract manner, e.g. relating to their position in the video image data or other sensor data. Preferably the features comprise at least some of the (e.g. parts of the) participants of the first party.

The features whose positions are determined may be identified in the video image data or other sensor data in any suitable and desired way. In one embodiment the features are identified using image recognition, e.g. to recognise people (and, e.g., their faces), furniture, etc. (or sub-components thereof). In one embodiment, the features are identified using feature recognition, e.g. by looking for areas in the video image data or other sensor data having high contrast. This may involve identifying parts of the image that have clearly identifiable features or that have a high degree of "uniqueness" to them. This helps to identify the borders of features and may, for example, identify features (e.g. in an abstract manner) without having to perform detailed image recognition.

In one embodiment the step of identifying features in the video image data or other sensor data (e.g. for each of the video camera(s) and/or sensors(s)) comprises identifying features in one or more regions of the video image data and/or the other sensor data. In one embodiment, the regions of the video image data and/or other sensor data in which features are identified comprise blocks of data. Thus preferably the video image data and/or other sensor data is divided into blocks for the purposes of comparing the video image data and/or other sensor data. The blocks of data preferably comprise square arrays of data elements, e.g. 32×32 or 64×64 pixels (although any suitable and desired shape and size of blocks may be used). Identifying features in regions (e.g. blocks) of the video image data or other sensor data helps to simplify the processing task of identifying such features by reducing the area over which features are identified (and thus the amount of data that has to be processed).

The step of identifying features in the video image data or other sensor data is preferably performed individually for (e.g. each of) the video camera(s) and/or sensors(s). In one embodiment, once this has been performed, the same or similar features that have been identified in the video image data or other sensor data from the plurality of video camera(s) and/or sensors(s) are matched to each other.

In order to match features from different camera(s) and/or sensor(s) in the array, preferably the method comprises (and the processing circuitry is arranged to) comparing one or more identified features or participants in (e.g. one or more regions of) the video image data and/or other sensor data from one of the video camera(s) and/or sensor(s) in the array with one or more identified features or participants in (e.g. one or more regions of) the video image data and/or other sensor data from other(s) of the video camera(s) and/or sensor(s) in the array. Preferably this comprises determining when one or more identified features in (e.g. one or more regions of) the video image data and/or other sensor data from different video camera(s) and/or sensor(s) contain the same or similar features.

Preferably the identified features in the video image data and/or other sensor data are compared by comparing the data (e.g. the data elements in the regions) for the identified features in the video image data and/or other sensor data from different video camera(s) and/or sensor(s) in the array. The comparison may comprise calculating a metric representative of the similarity of the (e.g. data elements of the) identified features in the video image data and/or other sensor data from different video camera(s) and/or sensor(s) in the array. Preferably the metric calculated accounts for errors in the data and the uniqueness of the identified features.

Preferably the comparison comprises applying a threshold to the metric to identify matching identified features in the (e.g. data elements of the regions of) the video image data and/or other sensor data from different video camera(s) and/or sensor(s) in the array. This helps to determine clearly identifiable and matched features in the video image data and/or other sensor data.

Preferably the comparison of identified features in the video image data and/or other sensor data from different video camera(s) and/or sensor(s) in the array takes into account the scale and rotation of the identified features, e.g. owing to an identified feature appearing differently depending on the relative location of the video camera(s) and/or sensor(s).

The matching of identified features in the video image data and/or other sensor data is preferably performed for the video image data and/or other sensor data from one or more pairs of video camera(s) and/or sensor(s) in the array. Matched features (e.g. that pass the threshold applied to the metric) are deemed a pair (and the data flagged or stored as such). Identified features that are not matched, or are matched with two or more other identified features, may be stored for later use.

At this stage, preferably a depth map, a 3D point cloud, a 3D mesh or a depth buffer is created for each pair of video camera(s) and/or sensor(s) in the array, e.g. between which identified feature(s) have been matched, for storing the (e.g. depth component of the) determined three-dimensional position(s) of the identified and matched feature(s). As outlined above, preferably the depth component of the three-dimensional position(s) of the identified and matched feature(s) is determined by determining the displacement between (e.g. by triangulating the positions of) the features using the video image data and/or the other sensor data from the array of video camera(s) and/or sensor(s).

In one set of embodiments the method comprises (and the processing circuitry is configured to) forming one or more point clouds using the determined three-dimensional position(s) of one or more identified and matched features, e.g. using the depth maps created, for each pair of video camera(s) and/or sensor(s) in the array, e.g. between which identified features have been matched. These initial "sparse" point cloud(s) may not contain many data points, e.g. owing to them only representing a single or a few identified features. However, such point cloud(s) may be helpful to act as a guide for the creation of more dense and accurate point cloud(s).

Preferably the information from the point cloud(s) (e.g. the location of the identified feature(s)) is used in an iterative process to re-analyse the identified and matched feature(s). For example, the positions in the point cloud(s) may be used to test against (e.g. the determined positions of) one or more of the identified features (whether matched or not) to determine if they have been correctly matched or not. This may be used to change the matching of identified features from different video camera(s) and/or sensor(s) and/or to refine the position of the identified and matched feature(s) in the point cloud(s). The number of iterations used may depend on the precision desired and/or on the processing time available.

At this stage, the video image data and/or sensor data from other(s) of the video camera(s) and/or sensor(s) (i.e. not the video camera(s) and/or sensor(s) that were used in the pair to match the identified features) may be used to help refine the position (e.g. depth) of the identified feature(s), e.g. in the point cloud(s). In a preferred embodiment the method comprises (and the processing circuitry is configured to) using the video image data and/or sensor data from other(s) of the video camera(s) and/or sensor(s) in the array to refine the (e.g. depth component of the) three-dimensional position(s) of the identified and matched feature(s). Thus, for example, feature(s) identified by other(s) of the video camera(s) and/or sensor(s) may be matched with previously matched feature(s), and used to refine the determined position (e.g. depth) of the matched feature(s). It will be appreciated that, owing to the different point of view of different video camera(s) and/or sensor(s), adding information from different video camera(s) and/or sensor(s) helps to improve the accuracy of the determined position of the identified feature(s). Any suitable and desired number of additional video camera(s) and/or sensor(s) may be used in this process, for identified feature(s) that can be matched with previously matched feature(s).

The virtual camera may be defined at a three-dimensional position in any suitable and desired way, e.g. using the features identified (and, e.g., matched) in the video image data or other sensor data. Preferably the virtual camera is positioned using the (e.g. face(s) of the) participant(s) of the first party identified in the captured video image data or other sensor data. Preferably the virtual camera is positioned using the direction in which the participant(s) are looking or facing (and thus preferably the method comprises identifying each of the participant's eyes (or the participant's head orientation or the participant's body orientation) in the captured video image data or other sensor data).

In one embodiment the virtual camera is (e.g. constrained to be) positioned near or within the area of the display. However, the virtual camera does not necessarily need to be located in the image plane of the display or, e.g., directed perpendicularly to the image plane of the display. The virtual camera may be positioned in the space between the display and the participant(s) of the first party or behind the plane of the display.

For example, in one embodiment, the virtual camera is positioned at a position between a participant in the first party and the displayed image of a participant in one of the other parties involved in the video conference call (e.g. when these participants are speaking to each other). Preferably the virtual camera is positioned such that the (e.g. eyes on the) faces of these participants are aligned perpendicularly to the direction between them through the virtual camera. This may be independent of how these participants are oriented with respect to their respective displays (and/or video cameras) and of where the physical video camera(s) and sensor(s) are positioned. It will be appreciated that a virtual camera positioned in this way will normally be close to the surface of the display in the first location, e.g. regardless of the size of the display and/or the number of participants.

The position of the virtual camera may be set at a fixed position (e.g. a particular position in the display of the video conferencing system), e.g. for the duration of a video conference call. In one embodiment, however, the position of the virtual camera is changed (dynamically) during the video conferencing call. For example, the position of the virtual camera may be changed to track the position of the face and/or eyes of a participant.

When there are multiple participants in the first party (and thus in the captured video image data and other sensor data), the virtual camera may be changed to be directed towards the participant who is speaking at any particular time. Thus preferably the system comprises a (e.g. array of) microphone(s) arranged to capture audio data of the first party and the method comprises capturing audio data of the first party at the first location using the (e.g. array of) microphone(s). Similarly, preferably the system comprises a (e.g. array of) loudspeaker(s) arranged to output audio data of one or more remote parties involved in the video conference call to the party at the first location.

Preferably the processing circuitry is configured to (and the method comprises) determining which participant is speaking at any one time, using one or more of the video image data, the other sensor data and the audio data. For example, the participant who is speaking may be identified by the movement of their mouth, e.g. using the three-dimensional position data of the feature(s) identified in the video image data and the other sensor data. The participant may be identified using voice recognition from the audio data, e.g. in combination with image recognition using the video image data and the other sensor data.

Only a single virtual camera may be defined. However, in one embodiment the method comprises (and the processing circuitry is configured to) defining a plurality of virtual cameras positioned at respective three-dimensional virtual camera positions. Each of the virtual cameras may be positioned as outlined above, for example.

In one embodiment a separate virtual camera is defined for each of a plurality of participants in the first party. This enables each virtual camera for the participants to be defined so to best represent the respective participant. In this embodiment preferably the transmitted and/or stored video image and/or sensor data comprises a collage of the image and/or sensor data composed by each of the virtual cameras (i.e. from each of their respective perspectives).

In one embodiment a separate virtual camera is defined for each of the one or more other parties at the respective remote locations. For example, when there are a plurality of other parties involved in the video conference call, each of these parties may be displayed in a separate window on the display of the first party in the first location or the parties may be collated together and displayed in a single window. A virtual camera may be positioned at the position of the window or the participants for each respective other party involved in the video conference call. This helps to facilitate eye contact between the parties who are speaking to each other at any particular time during the video conference call.

With the position(s) of the virtual camera(s) defined, the three-dimensional positions of the features in the video image data and the sensor data captured by each of the one or more video cameras and/or the one or more sensors in the array are transformed into a common coordinate system that has been defined. This allows the position of the features in the captured video image data and/or the sensor data relative to the position of the virtual camera to be determined.

The common coordinate system could be the coordinate system of the (or of each) virtual camera. However, preferably the common coordinate system is a (fixed) world space coordinate system. When multiple virtual cameras have been defined, preferably a separate transformation is performed for each of the virtual cameras.

When identified features have been matched together using pairs of video camera(s) and/or sensor(s), the common coordinate system may be based on the common coordinate system of a pair of video camera(s) and/or sensor(s). In another embodiment the common coordinate system may be defined based on a display of the system and/or on the walls of the room in which the system is located.

The three-dimensional positions of the features may be transformed in any suitable and desired way. When a point cloud has been formed for a (identified, matched) feature, in one embodiment, preferably the positions in the point cloud are transformed (e.g. moved, rotated and/or scaled) into the common coordinate system. When a plurality of point clouds have been formed (e.g. for multiple identified features), preferably each point cloud is transformed into the common coordinate system. This helps to transform all the determined positions into a single, unified coordinate system. When a single virtual camera has been defined, preferably all the point clouds that have been defined are transformed into the common coordinate system of that virtual camera.

In one embodiment, e.g. when the positions of the video camera(s) and/or the sensor(s) in the array are known or calibrated, it may not be necessary to form a point cloud of the determined positions of the identified features. In this embodiment, the method may transform the determined positions (e.g. in the form of a depth map) of the identified features directly into the common coordinate system (e.g. the coordinate system of the target virtual camera). This helps to reduce the amount of processing that needs to be performed. In this embodiment, preferably the positions of the video camera(s) and/or the sensor(s) in the array are known relative to each other (e.g. substantially exactly).

Preferably the video camera(s) and/or the sensor(s) in the array are located in the same plane and aligned with their field of view directed outwards perpendicularly to the plane in which they are located (e.g. the video camera(s) and/or the sensor(s) in the array are mounted on the same (flat) wall and are pointed in the same direction perpendicular to the wall). Preferably the video camera(s) and/or the sensor(s) in the array (e.g. each) comprise an alignment mechanism that is arranged to align their field of view to be directed outwards perpendicularly to the plane in which they are located. Preferably the virtual camera is located in the same plane and with the same alignment as the video camera(s) and/or the sensor(s) in the array.

When the array of video camera(s) and/or sensor(s) comprises a plurality of groups of video camera(s) and/or sensor(s), with each group located in a respective plane (e.g. on different walls, floor and/or ceiling), each group of video camera(s) and/or sensor(s) may be processed separately, e.g. separate transformations may be performed.

By restricting the virtual camera to be located in the same plane and being aligned with the video camera(s) and/or the sensor(s) in the array, it may be possible to combine one or more of the steps outlined above into a single step. In one embodiment, the (e.g. xyz) transformation required for (e.g. each pixel in) the image data and/or the sensor data of the video camera(s) and/or the sensor(s) to be mapped to the common coordinate system (e.g. of the virtual camera) may comprise an xy translation inversely proportional to the depth (z-coordinate) of the (e.g. identified feature(s) of the) image data and/or the sensor data, thus exploiting the perspective of the captured data. Thus preferably the method comprises (and the processing circuitry is configured to) transforming the image data and/or the sensor data of the identified feature(s) into the common coordinate system using an xy translation inversely proportional to the determined depth of the identified feature(s).

Thus, the xy positions in the original image data and/or the sensor data from the video camera(s) and/or the sensor(s) may be translated to an offset xy coordinate in the common coordinate system. The difference in the xy positions between the original image data and/or the sensor data and the common coordinate system may be calculated from the original depth (z-coordinate) of the (e.g. identified feature(s) of the) image data and/or the sensor data. The depth (z-coordinate) of the (e.g. identified feature(s) of the) image data and/or the sensor data may remain unchanged, owing to the video camera(s) and/or the sensor(s) lying in the same plane as each other and as the virtual camera.

When, as outlined below, features falling outside a particular volume are discarded, this may be performed simply using the xy coordinates of the common coordinate system, once the transformation has been performed, e.g. owing to these features being outside of the viewing frustum of the virtual camera. Furthermore, features that obscure each other owing to having the same xy coordinate but different z coordinates (e.g. following transformation) may be identified and the features appearing further away from the virtual camera may be discarded, e.g. such that only the one that is closest to the virtual camera is retained.

Preferably a depth (z) buffer (e.g. in the coordinate system of the virtual camera) is defined and filled with the (e.g. transformed) depth (z) position of each of the features represented in the video image data and/or the sensor data. If any (e.g. depth) data is missing at this stage for any of the features represented in the video image data and/or the sensor data, preferably this data is interpolated from the data which is present.

When a plurality of virtual cameras have been defined, preferably a separate depth buffer is defined and filled for each virtual camera.

Using the transformed three-dimensional position(s) in the common coordinate system of the feature(s) in the video image data and/or sensor data, preferably the method comprises (and the processing circuitry is configured to) selecting the feature(s) in the video image data and/or the sensor data having transformed three-dimensional position(s) in the common coordinate system that are within a particular range of three-dimensional positions. Thus a three-dimensional volume is set and features falling within this volume are selected.

Selecting features appearing in the video image data and/or the sensor data only within a particular three-dimensional range helps to enhance the view (e.g. of the participants) sent to the other party (or parties) in the remote location(s). For example, background features which may provide a distraction can be removed, thus providing a clearer view of the party in the captured video image data and/or sensor data to the other party (or parties). The selected features may also be used to control how the video image data and/or sensor data is presented to the other parties, as will be discussed below.

Using the transformed positions of the features in the captured video image data and/or sensor data, in one set of embodiments, a particular range of three-dimensional positions is defined and the features falling within this range of positions are selected. Preferably the image and/or sensor data of features that fall outside of the particular range are discarded (and thus not transmitted to the other party (or parties) and/or stored). The particular range may be defined in any suitable and desired way. In one embodiment the particular range comprises a depth range. In one embodiment the particular range comprises a volumetric range (e.g. stage).

The range may only have a single endpoint, e.g. the range may be set such that features within a particular distance (e.g. depth) from the virtual camera are selected. This helps to separate the participant(s) from the features in the background (e.g. the furniture) of the first location. Thus the particular range may be set depending on the determined three-dimensional (or depth) positions of the participants in the first party.

When a (e.g. merged) depth buffer has been defined and populated, the particular range may comprise a depth range. With a depth buffer, such a range is simple to apply.

In one embodiment particular (e.g. identified) features in the video image data and/or the sensor data are selected based on image recognition of these features, e.g. as well as selecting the features based on their three-dimensional positions. This may allow the participant(s) and their face(s) to be selected from the video image data and/or the sensor data.

When multiple virtual cameras are defined, different features may be selected to be shown from the perspective of the different virtual cameras respectively. For example, each virtual camera may be used to portray a single selected feature (e.g. a feature of a participant, such as their eyes, nose or mouth) from the perspective of that virtual camera.

Once the features falling within the volume have been selected for further processing, for example, the video image data and/or the sensor data (e.g. of the selected features) from the video camera(s) in the array are used (e.g. combined) to form a single, composite stream of video image data and/or sensor data which appears as having been captured from the perspective of the virtual camera. Thus preferably the method comprises (and the processing circuitry is configured to) combining the video image data from the one or more video cameras and/or the data captured by the one or more sensors to form the single view of the feature(s) as appearing to have been captured from the virtual camera. Preferably the video image data and/or the sensor data (e.g. of the selected features) are processed (e.g. combined) such that the face(s) and/or eye(s) and/or body of the participant(s) in the captured video image data and/or sensor data are oriented perpendicularly to the direction to them from the virtual camera.

The video image data from the video camera(s) and/or the sensor data from the sensor(s) in the array may be combined in any suitable and desired way. As well as combining video image and/or sensor data from a plurality of video cameras and/or sensors to form the video image and/or sensor data from the perspective of the virtual camera, video image and/or sensor data from a range of different times (e.g. both past and present) may be combined to form the video image and/or sensor data to be transmitted and/or stored. Thus multiple frames of video image and/or sensor data over a period of time (e.g. both present and previous frames) may be combined.

In one embodiment method comprises (and the processing circuitry is configured to) forming a triangulated mesh, point cloud or depth buffer of the (e.g. selected features from the) video image data and/or sensor data, e.g. using the determined three-dimensional positions. The triangulated mesh, point cloud or depth buffer may be used to form a (e.g. crude) clay model of the features (e.g. corresponding to the participant(s) in the first party).

When multiple triangulated meshes, point clouds or depth buffers have been formed (e.g. for different features and/or from different pairs of video camera(s) and/or sensor(s)), preferably the multiple triangulated meshes, point clouds or depth buffers are combined (merged) into a single triangulated mesh, point cloud or depth buffer, e.g. after they have been transformed into the common coordinate system. In the embodiments in which the video camera(s) and/or sensor(s) are at known or calibrated positions, the depth information (e.g. depth maps) may be combined (merged) after having been transformed, e.g. without having first formed point clouds.

When the video image data from the video camera(s) and/or the sensor data from the sensor(s) in the array is combined, positions (e.g. pixels) that are close to each other may be "oversampled". Such points which are overlapping or very close to each other may be considered, in order to extract information about these points. This helps to reduce classical sources of errors and visual artefacts in the final rendered image.

In one embodiment, the colour to be assigned for a particular feature (e.g. pixel) in the final rendered image (i.e. as seen from the virtual camera) is calculated by combining (e.g. averaging) the colours obtained from at least some of (e.g. all) the video cameras from which the feature is visible. Preferably the method comprises (and the processing circuitry is configured to) combining (e.g. averaging) the colour data from the one or more video cameras and/or the data captured by the one or more sensors to form the single view of the feature(s) as appearing to have been captured from the virtual camera. This helps to dampen the glare or any unwanted reflections that may visible in the feature as appearing from one of the video cameras. The input from one or more video cameras may be excluded from this average, e.g. when its colour value deviates by more than a particular amount from the colour values from the other video cameras, as this may indicate that these one or more video cameras is suffering from a large amount of glare.

Combining the colours also helps to reduce noise in the final rendered image. All video cameras have at least some noise. Especially in indoor areas there are rarely enough photons hitting the camera sensor to avoid noise. Noise decreases the accuracy and quality of the final image. By combining (e.g. averaging) the colour information from multiple camera sensors when rendering the final image as seen from a virtual camera noise may be reduced or substantially eliminated in the final image.

In one embodiment, the colours of a particular feature (e.g. pixel) may be combined using a ray function model. This may help to discover properties about the reflectivity of a particular feature (e.g. pixel), such that masks for different parts of the final image may be determined. Such a ray function model, which takes the colour values for a particular feature (e.g. pixel) from multiple different video cameras, may be able to deduce the albedo and the reflectivity of the particular feature (e.g. pixel).

The albedo of a particular feature will generally be static, but the reflectivity component may be different for the different video cameras, e.g. owing to the angle of the video camera relative to the feature and to the source(s) of light illuminating the feature. Using the position (e.g. xyz coordinate) of a particular feature (e.g. pixel), the curvature of the particular feature (e.g. pixel) may be calculated. A ray function may then be created by combining the curvature and the reflectivity from each observed camera angle. The ray function quantifies how reflective a surface is from any given angle. Features (e.g. pixels) that share similar (e.g. the same) ray function properties may be grouped together in a mask. Different masks may help to identify which parts of an image represent different features, e.g. skin, hair, clothes, furniture, metal. This is because different materials have different reflectivities, allowing them to be isolated from each other.

This approach helps to allow features (e.g. objects) which are difficult to render (owing to them being metallic (e.g. highly reflective) or transparent (e.g. glass)) to be identified, transformed and rendered correctly. This helps to reduce artefacts in the final rendered image, e.g. because the feature is not solely relying on the image data from a single video camera.

Preferably the triangulated mesh, point cloud or depth buffer of the (e.g. selected) features is filled with image and/or sensor data of the selected features from the video camera(s) and/or sensor(s) in the array. Preferably the image and/or data of the features from the video camera(s) and/or sensor(s) in the array is warped onto the triangulated mesh, e.g. warped into the perspective of the virtual camera. Wrapping the triangulated mesh (e.g. clay model) with the video image and/or sensor data in this way helps to render complete features (e.g. faces of the participants) for transmitting to the other party or parties and/or for storing.

When the triangulated mesh, point cloud or depth buffer is filled with image and/or sensor data from multiple video cameras, each pixel may be combined into a single pixel using an algorithm to determine the most desirable representation, e.g. by averaging.

When the video image and/or sensor data of the (e.g. selected) features is used (e.g. combined) to form the video image and/or sensor data from the perspective of the virtual camera, in some embodiments the video image and/or sensor data is manipulated to improve the visual appearance of the video image and/or sensor data transmitted to the other party or parties and/or stored. This helps to avoid any undesirable stitching artefacts or specular highlights when the video image data from the video cameras in the array are merged, for example.

Preferably the video image and/or sensor data of the (e.g. selected) features are weighted, blended and/or interpolated. This may be based on one or more of: the position(s) of the video camera(s) and/or sensor(s) that captured the video image and/or sensor data (e.g. the position and/or angle relative to the virtual camera), the specularity (the amount of reflectivity a surface has) of the selected features, the property or properties of the video camera(s) and/or sensor(s) that captured the video image and/or sensor data.

It will be appreciated that using (e.g. combining) the video image and/or sensor data of the (e.g. selected) features may not result in a whole frame of video image and/or sensor data for transmitting to the other party or parties and/or for storing. In one embodiment the features are isolated from the background. In one embodiment the features are superimposed onto a (e.g. artificially generated) background. In one embodiment the background to the selected features is blurred, so that the features (e.g. the participant(s) of the first party) are enhanced.

The (e.g. selected) features may be aligned and/or scaled to each other. This helps to present each feature in the same way in the transmitted and/or stored image and/or sensor data. When multiple virtual cameras are used, preferably the video image and/or sensor data for the feature(s) (e.g. selected) for each virtual camera are arranged into a collage, e.g. such that the views from the virtual cameras are presented in an array in the video image and/or sensor data transmitted to the other party or parties and/or stored. The collage may be created such that the video image and/or sensor data for each virtual camera is given an equal area in the video image and/or sensor data stored and/or transmitted to the other party or parties. This helps to provide optimum use of the display space.

When the video conference call comprises a one to many call or a many to many call, the video image data for the multiple different parties may be arranged in a collage for display to each of the other parties in a similar manner. In one embodiment, a collage is created of participants from multiple different parties, e.g. of participants from each of the parties except the party to whom the data is being transmitted and/or stored. This creates a virtual location in which the participants from multiple locations are combined (e.g. around a virtual table). For example, each participant (e.g. from multiple different locations) may be positioned evenly around the virtual table such that their orientation to the other participants is consistent.

In one embodiment, e.g. when a collage is created, the participant who is speaking (or other suitable (e.g. selected) feature(s)) is highlighted in the video image and/or sensor data stored and/or transmitted to the other party or parties. The speaking participant (or other suitable (e.g. selected) feature(s)) may be highlighted by increasing the size (i.e. scaling) and/or brightness of their representation in the video image and/or sensor data, or the other regions of the video image and/or sensor data (e.g. surrounding the speaking participant) may be de-emphasised, e.g. by reducing colour saturation or intensity. This helps to create emphasis or focus for the speaking participant or selected feature.

In one embodiment the selected feature(s) may be displayed with their background removed. Instead, the selected feature(s) may be displayed on a neutral background or in a "virtual environment", which replaces the actual environment that has been removed. The use of a virtual environment may also allow dynamic features such as a virtual screen to be contained in the display.

In one embodiment, the (e.g. selected) feature(s) may be processed (e.g. manipulated) to enhance their appearance.

Once the video image and/or sensor data of the selected feature(s) has been generated from the perspective of the virtual camera(s), the video image and/or sensor data may be stored and/or transmitted to the one or more other parties. The video image and/or sensor data may first be compressed according to any suitable and desired video codec. The video image and/or sensor data may then be displayed on a display of the other party or parties as appropriate.

Alternatively or in addition, data representative of the transformed three-dimensional position(s) of the feature(s) may be transmitted to the one or more parties. This may then allow the one or more parties to use the three-dimensional data to render to an image in order to recreate the video image and/or sensor data.

Thus in preferred embodiments the method (e.g. of holding a video conferencing call between a first party at a first location and one or more other parties at one or more remote locations respectively) comprises (and the processing circuitry (e.g. in a video conferencing system for holding a video conferencing call between a first party at a first location and one or more other parties at one or more remote locations respectively) is configured to) transmitting the video image and/or sensor data of the feature(s) as viewed from the perspective of the virtual camera and/or data representative of the transformed three-dimensional position(s) of the feature(s) to the one or more other parties.

Preferably the method comprises (and the one or more parties (e.g. each) comprises processing circuitry arranged to) displaying the transmitted video image and/or sensor data of the feature(s) as viewed from the perspective of the virtual camera or using the data representative of the transformed three-dimensional position(s) of the feature(s) to display the feature(s) as viewed from the perspective of the virtual camera.

The transmitted video image and/or sensor data may be displayed at any suitable and desired location. The rendering process may be performed locally (e.g. where the data is captured) or remotely (e.g. where the data is to be displayed), or even in the "cloud" between the participants of the videoconferencing call. In this latter case, the combined point cloud formed may be transmitted from the location in which the data was captured to an intermediate (e.g. "cloud") location (e.g. a data centre, such as Microsoft Azure or AWS) where the data is rendered and the final data stream is forwarded to the other participant(s).

In one embodiment the video image and/or sensor data of the feature(s) and/or the data representative of the transformed three-dimensional position(s) of the feature(s) is stored. This may allow a third party to use this data at a later time to display the feature(s) as viewed from the perspective of the virtual camera, e.g. by using the video image and/or sensor data directly, or by rendering the three-dimensional data to an image in order to recreate the video image and/or sensor data. This may be useful for recording a presentation (e.g. a conference with only one participant) such that the recorded presentation may be played back one or more times to the viewers.

The video image and/or sensor data of the feature(s) and/or the data representative of the transformed three-dimensional position(s) of the feature(s) that is stored may be recorded with a fixed virtual camera or in a (e.g. custom) format that allows the viewer to determine the position of the virtual camera when viewing the recorded data.

The system outlined above has been described from the perspective of the first party. However, it will be appreciated that in at least some preferred embodiments each party to the video conference call is using a system comprising an array of video camera(s) and/or sensor(s) to capture image data of themselves, which is preferably processed as outlined above. Thus the system may comprise an array of video camera(s) and/or sensor(s) and, e.g., processing circuitry configured to perform the steps of the present invention at each location.

The system preferably also comprises a display, (e.g. an array of) microphone(s) and a (e.g. array of) loudspeaker(s) at each location.

The processing of the video image and/or sensor data from each location may be performed by processing circuitry local to the respective party captured in the video image and/or sensor data or the processing of the video image and/or sensor data may all be performed at one of the (or a remote) location, e.g. on a VPS host or in the cloud. Thus each location may comprise processing circuitry arranged to process the captured video image and/or sensor data in the manner of the present invention.

Such processing circuitry may perform all of the steps outlined above or the various steps may be split between processing circuitry in different locations. For example, the processing of the video image and/or sensor data to determine the positions, define the virtual camera, transform the positions, select the features in the video image and/or sensor data and then combine the video image and/or sensor data to form a single view from the virtual camera may be performed by processing circuitry in one location (e.g. local to where the video image and/or sensor data was captured) and the step of composing the scene (e.g. in a collage) for display may be performed by processing circuitry in another location (e.g. a central location or local to where the video image and/or sensor data is to be displayed).

In embodiments, the system may comprise, and/or may be in communication with, one or more memories and/or memory devices that store the data described herein (e.g. the raw and processed video image and/or sensor data), and/or store software for performing the processes described herein. The system may comprise, and/or may be in communication with, a host microprocessor and/or a display for displaying the video image data.

The memory or memories referred to herein may be any desired and suitable memory of or for the system. The memory may be, for example, main system memory. The memory may be external to the data processing system (e.g. a distributed memory).

The method may be performed in any suitable and desired way and on any suitable and desired platform. In preferred embodiments the method of holding a video conference call is a computer implemented method, e.g. the steps of the method are performed by processing circuitry.

The methods in accordance with the present disclosure may be implemented at least partially using software, e.g. computer programs. It will thus be seen that the present disclosure may also provide computer software specifically adapted to carry out the methods described herein when installed on a data processor, a computer program element comprising computer software code portions for performing the methods described herein when the program element is run on a data processor, and a computer program comprising code adapted to perform all the steps of a method or of the methods described herein when the program is run on a data processing system.

The present disclosure also extends to a computer software carrier comprising such software arranged to carry out the steps of the methods of the present disclosure.

Such a computer software carrier could be a physical storage medium such as a ROM chip, CD ROM, DVD, RAM, flash memory or disk, or could be a signal such as an electronic signal over wires, an optical signal or a radio signal such as to a satellite or the like.

It will further be appreciated that not all steps of the methods of the present disclosure need be carried out by computer software and thus from a further broad aspect the present disclosure provides computer software and such software installed on a computer software carrier for carrying out at least one of the steps of the methods set out herein.

The present disclosure may accordingly suitably be embodied as a computer program product for use with a computer (e.g. data processing) system. Such an implementation may comprise a series of computer readable instructions either fixed on a tangible, non-transitory medium, such as a computer readable storage medium, for example, diskette, CD ROM, DVD, ROM, RAM, flash memory or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic or optical, or transmitted using any communications technology, present or future, including but not limited to optical, infrared or microwave. It is contemplated that such a computer program product may be distributed as a removable medium with accompanying printed or electronic documentation, for example, shrink wrapped software, pre-loaded with a computer system, for example, on a system ROM or fixed disk, or distributed from a server or electronic bulletin board over a network, for example, the Internet or World Wide Web.

BRIEF DESCRIPTION OF THE FIGURES

Certain embodiments of the invention will now be described, by way of example only, with reference to the accompanying drawings, in which.

DETAILED DESCRIPTION OF THE PREFERRED EMBODIMENTS

Video conferences allow parties who are in different locations, e.g. rooms, buildings, cities and even countries, to communicate with each other by exchanging video image and sound data over a video conferencing call. Some exemplary systems, in accordance with embodiments of the present invention will now be described.

Figure 1:
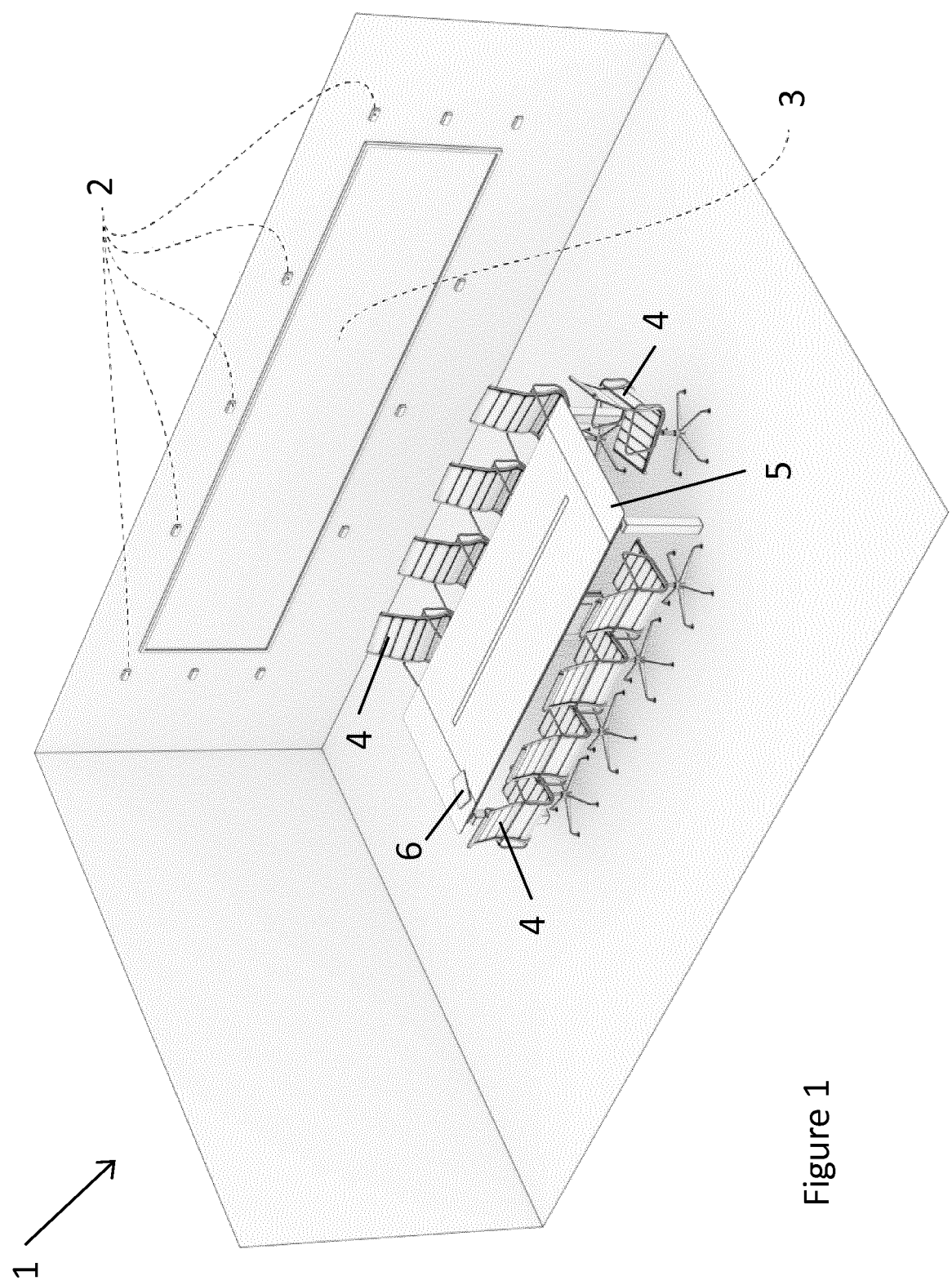
FIG. 1 shows a room in which at least part of a video conferencing system according to an embodiment of the present invention is installed.

FIG. 1 shows a room 1 in which at least part of a video conferencing system according to an embodiment of the present invention is installed. The system includes multiple video cameras 2 mounted in an array around a video display screen 3. The video cameras 2 are arranged to capture video image data of the users of the video conferencing system who will typically be sitting on the chairs 4 around the table 5 in the room 1 (the users are not shown for the purposes of clarity). The display screen 3 is arranged to display video image data of users at the other end of the video conferencing call.

The system also includes a microphone and loudspeaker unit 6 (or an array of multiple such units) on the table 5 (or other suitable location). The microphone and loudspeaker unit 6 is arranged to capture sound data of the users of the video conferencing system and to output the sound captured from the users at the other end of the video conferencing call.

Figure 2:
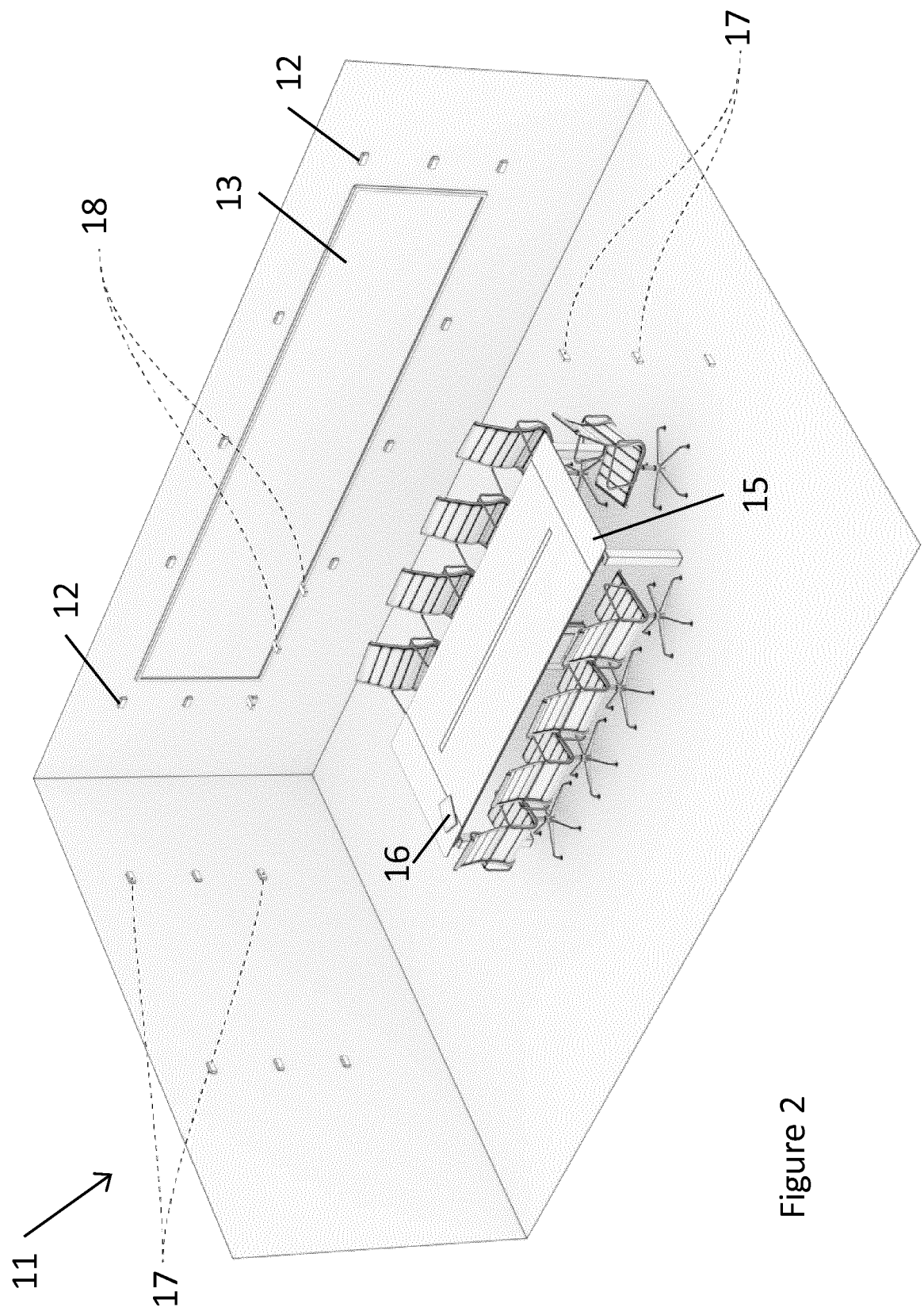
FIG. 2 shows a room in which at least part of a video conferencing system according to another embodiment of the present invention is installed.

FIG. 2 shows a room 11 in which at least part of a video conferencing system according to another embodiment of the present invention is installed. The system shown in FIG. 2 is similar to the system in FIG. 1, in that it includes multiple video cameras 12 mounted in an array around a video display screen 13 and a microphone and loudspeaker unit 16 on the table 15. In addition, the system includes multiple video cameras 17 mounted in arrays on some of the side walls of the room 11 (i.e. the walls on which the video display screen 13 is not mounted) and multiple video cameras 18 mounted in an array on the ceiling of the room 11.

Figure 3:
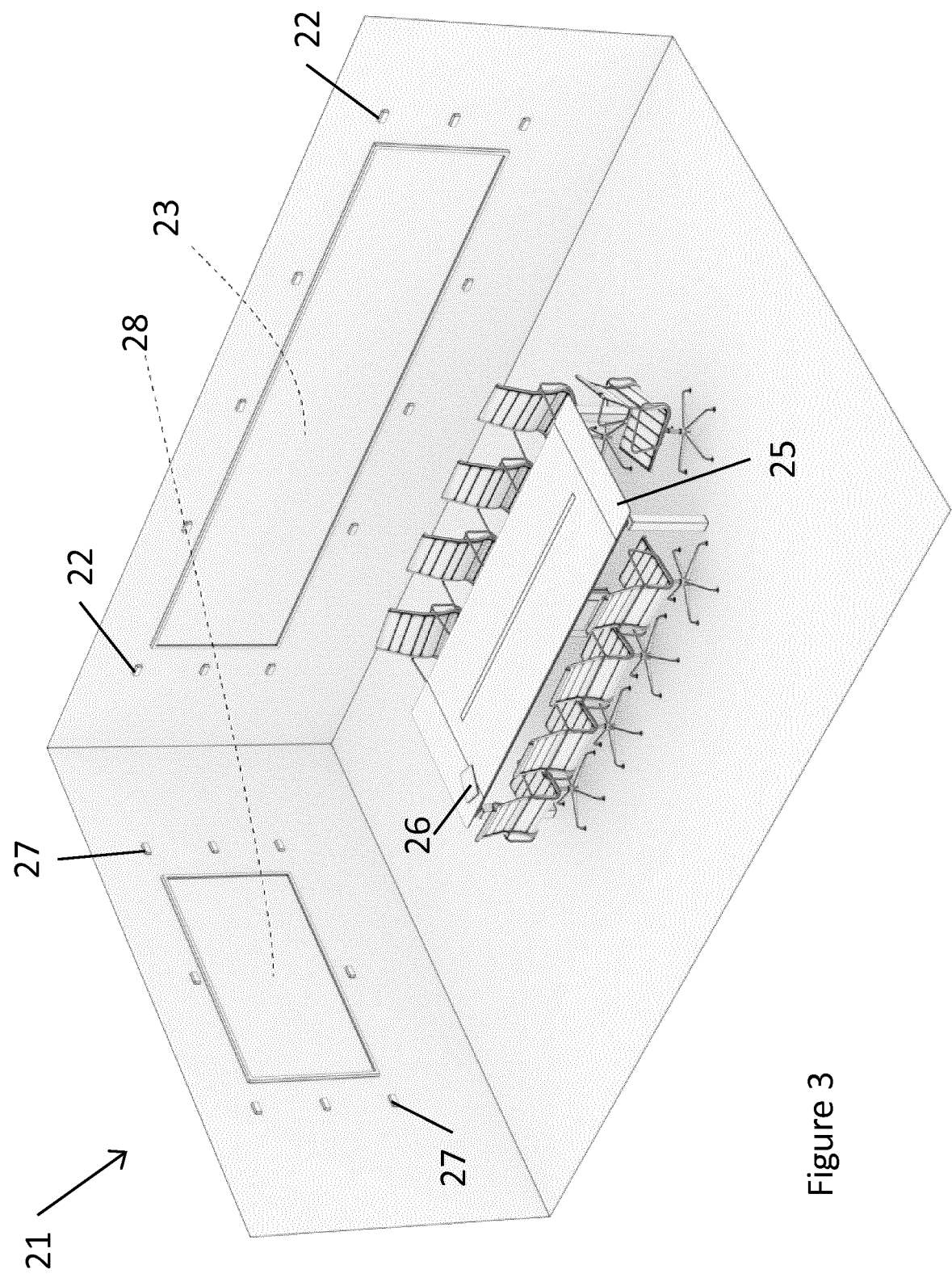
FIG. 3 shows a room in which at least part of a video conferencing system according to another embodiment of the present invention is installed.

FIG. 3 shows a room 21 in which at least part of a video conferencing system according to another embodiment of the present invention is installed. The system shown in FIG. 3 is similar to the system in FIG. 2, in that it includes multiple video cameras 22 mounted in an array around a video display screen 23, multiple video cameras 27 mounted in an array on a side wall of the room 21 and a microphone and loudspeaker unit 26 on the table 25. In addition, the system includes a second display screen 28 mounted between the array of video cameras 27 on the side wall. This allows users of the system to look at either of the display screens 23, 28, e.g. depending where around the table 25 they are sitting. Typically these different screens 23, 28 will show the output from different virtual cameras.

Figure 4:
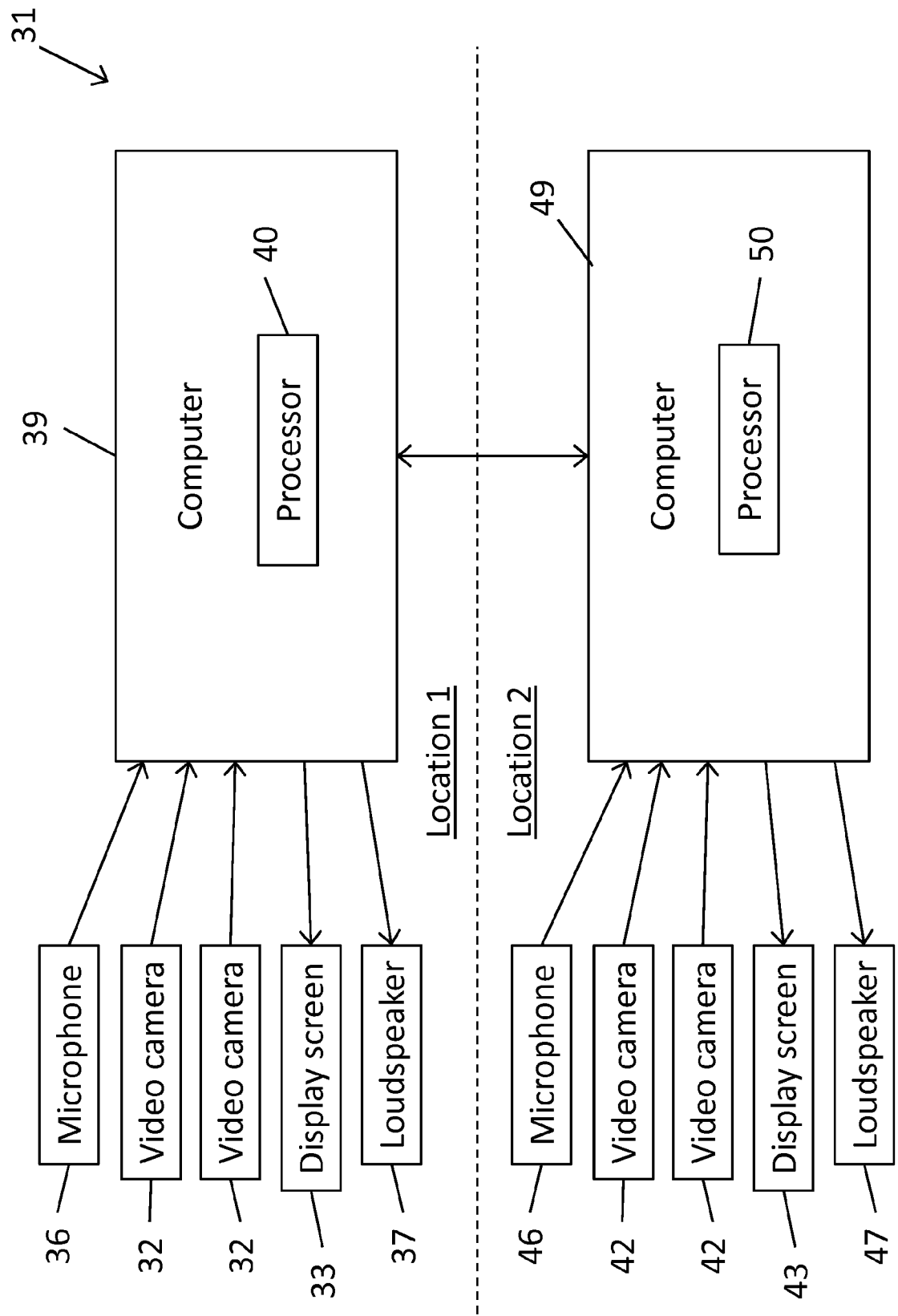
FIG. 4 shows schematically the components of a video conferencing system according to an embodiment of the present invention.

FIG. 4 shows schematically the components of a video conferencing system 31 according to an embodiment of the present invention. As shown in FIGS. 1-3, the system 31 includes multiple video cameras 32, a display screen 33, a microphone 36 and a loudspeaker 37 (the latter two of which may be combined in a single unit, as shown in FIGS. 1-3). The video cameras 32 and the microphone 36 provide inputs to a computer 39 of the system 31, with the display screen 33 and the loudspeaker 37 being arranged as outputs from the computer 39. The computer 39 has a processor 40 arranged to process the data received from the inputs and to control the data delivered to the outputs, e.g. in accordance with embodiments of the present invention.

The computer 39, along with its inputs and outputs, is arranged in a first location ("location 1") at which one set of users may use the video conferencing system 31. The computer 39 is in data communication (e.g. via the internet) with a similar computer 49 in a different location ("location 2") at which another set of users may use the video conferencing system 31 to communicate with the user(s) at the first location. This computer 49 also has a processor 50 and is connected to multiple video cameras 42 and a microphone 46 which provide inputs, and to a display screen 43 and a loudspeaker 47 which provide outputs.

Figure 5:
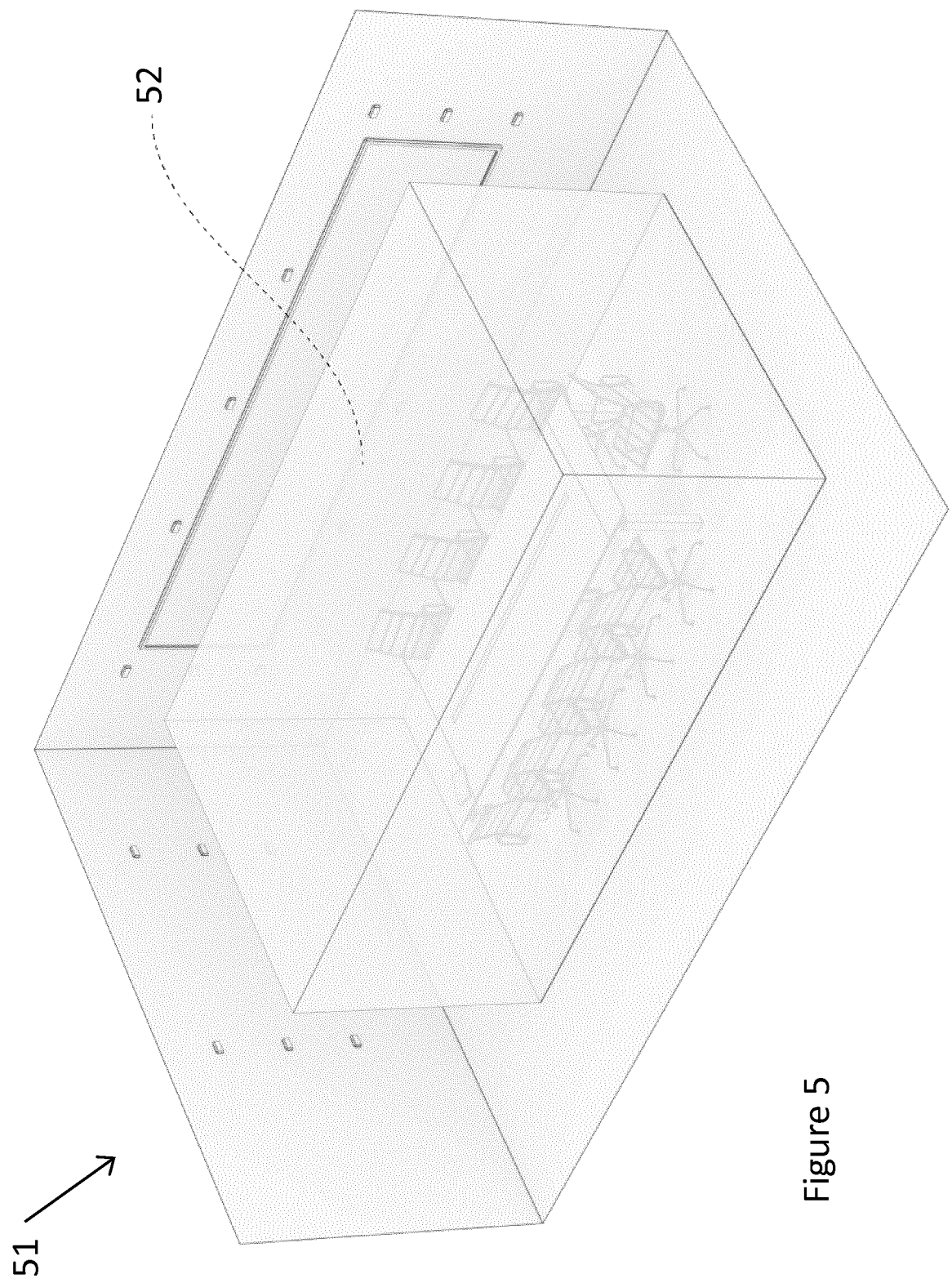
FIG. 5 shows a room in which at least part of a video conferencing system according to another embodiment of the present invention is installed.
Figure 6:
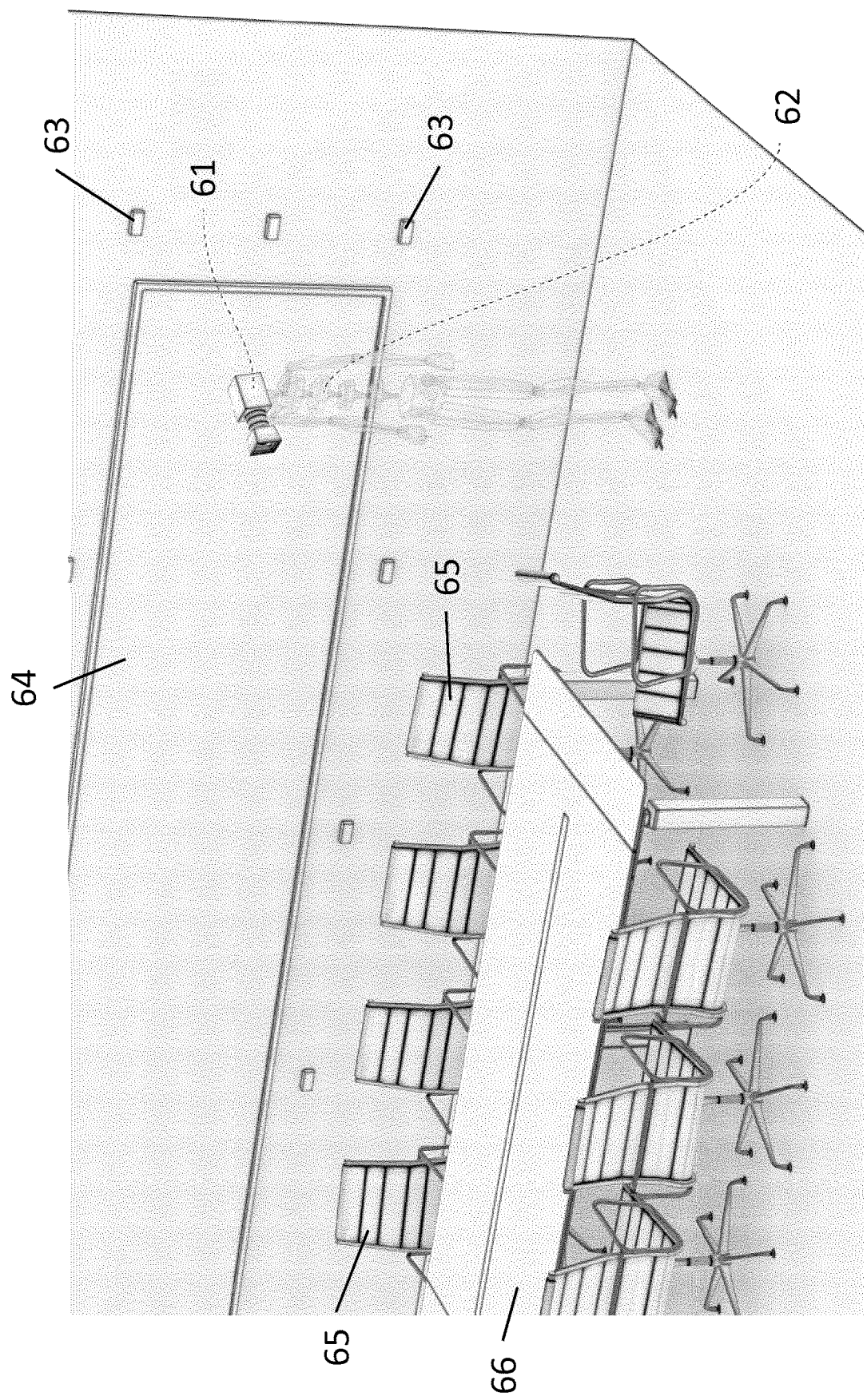
FIG. 6 shows the positioning of a virtual camera according to an embodiment of the present invention.
Figure 7:
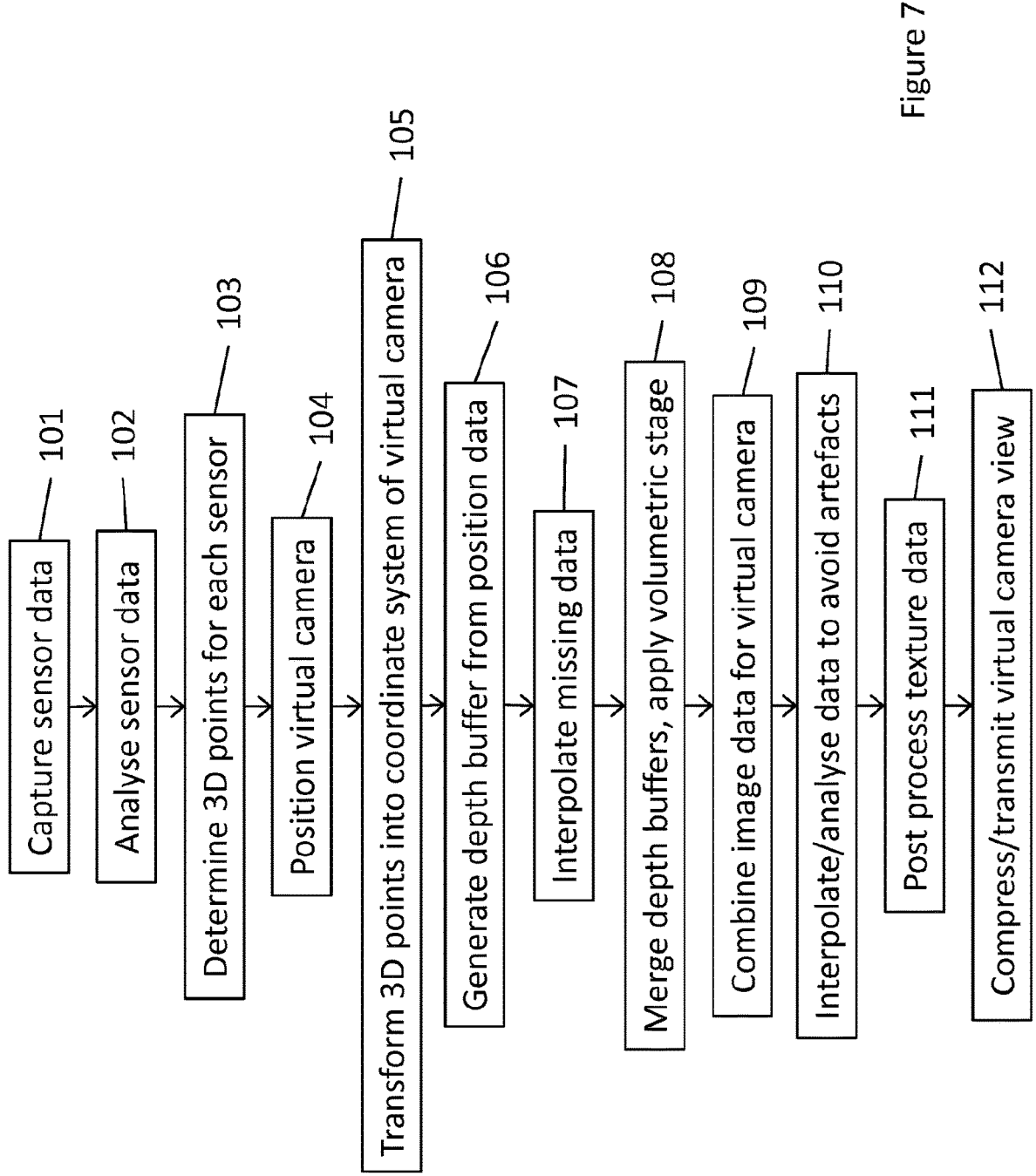
FIG. 7 shows a flow chart outlining the main steps of a method according to an embodiment of the present invention.

Operation of the video conferencing system 31 shown in FIG. 4 (e.g. in the configurations shown in FIGS. 1-3) will now be described with reference to FIGS. 5-7. FIG. 5 shows a room 51, similar to that shown in FIG. 2, in which at least part of a video conferencing system according to an embodiment of the present invention is installed and a volumetric stage 52 is used. FIG. 6 shows the positioning of a virtual camera 61 and a virtual camera man 62. FIG. 7 shows a flow chart outlining the main steps of a method according to an embodiment of the present invention.

First, either when the video conferencing system 31 is being set up or at the beginning of each call that is made, the arrays of video cameras 32, 42 are calibrated. This involves determining the relative position of the video cameras 32, 42 in each array to each other, e.g. using known positions in each room.

When a video conferencing call is set up between two parties in the two different locations (e.g. using the video conferencing system 31 shown in FIG. 4 with the two computers 39, 49), the respective video cameras 32, 42 and microphones 36, 46 capture image and sound data (step 101, FIG. 7). The video cameras and microphones may be arranged, for example, at each location as shown in FIGS. 1-3.

The captured image and sound data is passed from the video cameras 32, 42 and microphones 36, 46 to the respective computers 39, 49 where it is analysed by the respective processors 40, 50 (step 102, FIG. 7). The analysis of the video image data captured by the video cameras 32, 42 enables features (e.g. of the user's faces and bodies) to be identified using feature recognition (e.g. by finding points in the video image data containing high contrast).

The three-dimensional (3D) positions of the features captured in the video image data are also determined for each of the video cameras 32, 42, using triangulation between the different video cameras 32, 42 in each array (step 103, FIG. 7). Using this determination of the 3D positions, a depth (z) position is then assigned to each point of each image captured by the video cameras 32, 42.

Using the feature recognition of the video image data, the respective processors 40, 50 determine a location at which to position a virtual camera and the direction in which it should be pointed (step 104, FIG. 7). For example, bodies, faces and/or eyes of users that have been identified in the video image data captured by the video cameras 32, 42 are used to determine the location and direction of the virtual camera. The video image data that is eventually sent to the other party on the video conferencing call will appear to come from the perspective of the virtual camera.

FIG. 6 shows an example of how a virtual camera 61 (and a virtual camera man 62, for context) may be positioned. It can be seen that the position at which the virtual camera 61 has been placed in FIG. 6 is different from the positions of the multiple video cameras 63 that are located around the perimeter of the display screen 64 on the wall. It can be seen that the position of the virtual camera 61 and the direction in which it is pointing enables the participants of the video conference (sitting on the chairs 65 around the table 66) to be seen better by the other party, compared to the view from the video cameras 63 on the wall.

The virtual camera 61 may be positioned using the features identified in the captured video image data according to a number of different criteria, e.g. the position or direction in which the participants are sitting, facing, looking, etc. The position of the virtual camera 61 need not remain fixed throughout a video conferencing call, it may change depending on who is speaking or if the participants move or alter the position in which their body, head or eyes are facing, for example.

Figure 8:
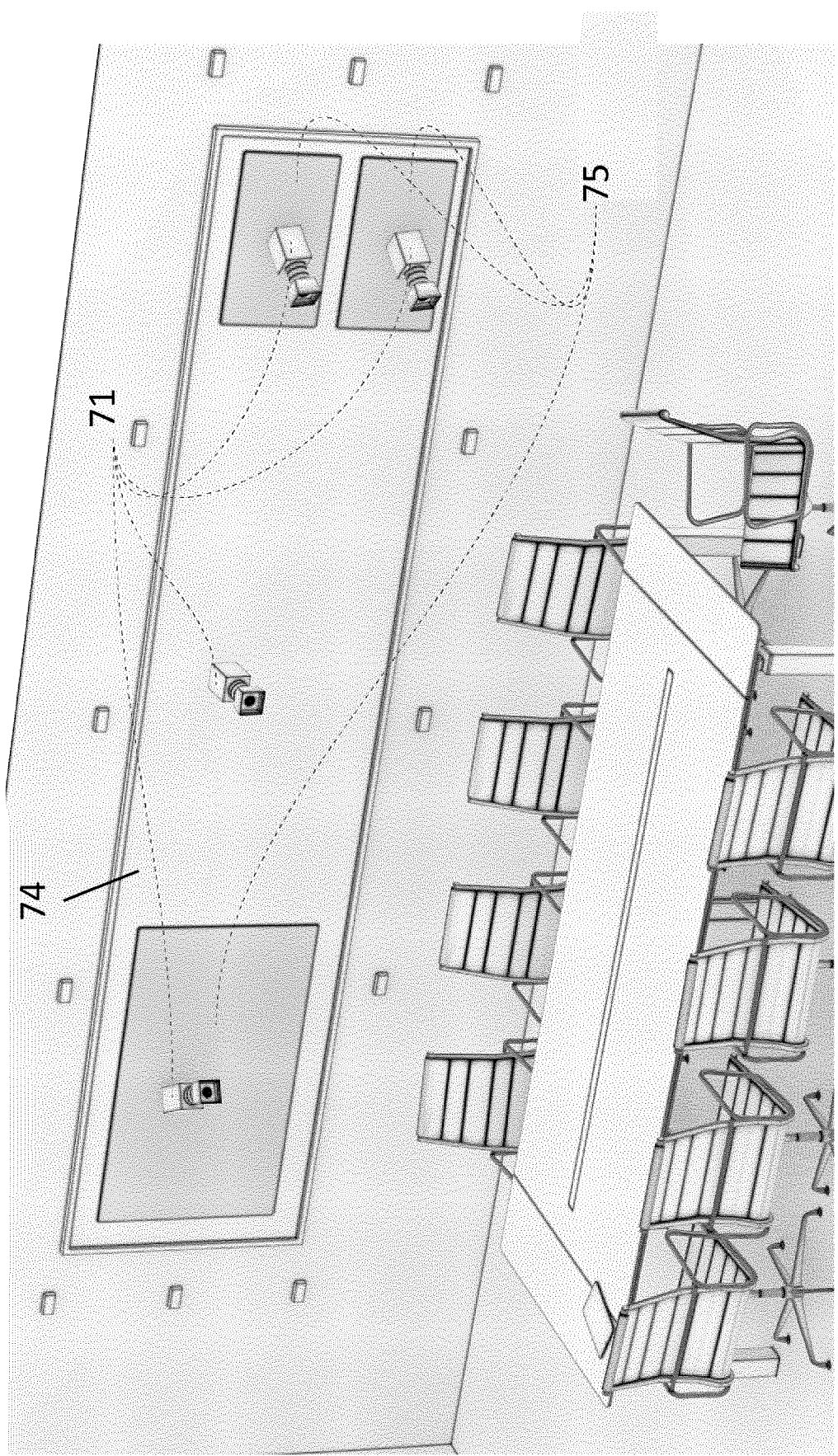
FIG. 8 shows a room in which at least part of a video conferencing system according to another embodiment of the present invention is installed.

Furthermore, in accordance with another embodiment and as shown in FIG. 8, the video conferencing system may establish multiple virtual cameras 71 at different positions around the room (e.g. within the area of the display screen 74 as shown in FIG. 8). As shown in FIG. 8, three of the virtual cameras 71 are located within windows 75 displayed on the screen. These may, for example, be used to display participants of the video conferencing call at multiple different locations.

Using the determined position of the virtual camera 61, the 3D position data of the of the features captured in the video image data (for each of the video cameras 32, 42) are transformed into the coordinate system of (i.e. relative to) each virtual camera 61, 71 (step 105, FIG. 7).

From the captured video image data and the transformed 3D position data from the video cameras 32, 42, a depth (z) buffer is generated in the coordinate system of the virtual camera 61, 71 (step 106, FIG. 7), for each virtual camera 61, 71 being used. Any data that is missing at this stage (e.g. video image data not having an assigned 3D position) is interpolated (step 107, FIG. 7).

Following this, when multiple virtual cameras 71 are being used, the multiple depth buffers are merged (step 108, FIG. 7). When the multiple depth buffers are merged, a volumetric stage is applied to the captured video image data (or as a separate step when there is only a single virtual camera 61 and so only a single depth buffer), (step 108, FIG. 7).

The step of applying a volumetric stage 52 is shown in FIG. 5. Using the 3D positions assigned to the features captured in the video image data, the volumetric stage 52 identifies and extracts the features that fall within the volumetric stage 52. All the rest of the captured video image data, corresponding to features that have been identified as lying outside of the volumetric stage 52, are discarded. Applying the volumetric stage 52 means that only the video image data that is of interest in being viewed by the other parties of the video conferencing call (i.e. the video image data of the participants within the volumetric stage 52 in the room 51) needs to be processed further for transmitting to these other parties.

The remaining video image data (i.e. that fell inside the volumetric stage 52) from each of the video cameras 32, 42 is combined by creating a triangulated mesh for each of the participants to form a crude clay model of each participant. Alternatively a different process may be used to warp the video image data based on interpolated 3D positions in the coordinate space of the virtual cameras 61, 71. The video image data from each of the video cameras 32, 42 is wrapped onto the clay model to render a complete body and face of each participant, from the viewpoint of each virtual camera 61, 71 being used (step 109, FIG. 7). This acts to combine the captured image data from each of the video cameras 32, 42 into a single view from each virtual camera 61, 71. The merged depth buffer contains the information needed to select and combine the captured image data from the video cameras 32, 42.

Also at this stage, the video image data is analysed, interpolated and processed to avoid any specular highlights or undesirable stitching artefacts from combining the images (step 110, FIG. 7). The video image data from each video camera 32, 42 is weighted and blended appropriately, taking into account the angle of each video camera 32, 42 from the feature in the image data (step 111, FIG. 7).

When multiple virtual cameras 71 are used, the combined video image data for each virtual camera is then arranged in a collage for presentation to the other party.

The video image data, from the perspective of the (or each) virtual camera 61, 71, is then compressed and transmitted by the computer 39 in the first location to the computer 49 in the second location, where it can be displayed on the display screen 43 in the second location.

In the same manner, at the same time during the video conference call, the system in the second location captures video image data using the multiple video cameras 42 and the computer 49 processes the video image data, which is then transmitted to the computer 39 in the first location for display on the display screen 33 in the first location.

It will be appreciated that the system 31 shown in FIG. 4 can be expanded to include three or more parties for a one to many or a many to many video conference call. In this case, the video image data generated from the perspective of each of the virtual cameras is collated into a collage for transmission to the other parties involved in the video conference call, as appropriate. It will also be appreciated that in addition to or instead of the video cameras, the system may comprise one or more sensors arranged to capture sensor data that is then used in the same manner as the captured video image data.

Furthermore, the data that is transmitted may, instead of the video image and/or sensor data, be the data that is representative of the transformed three-dimensional positions of the features of the participants. Such video image data or transformed three-dimensional position data may be stored, e.g. instead of being transmitted, such that the video image data may be viewed at a later data.

It can be seen from the above that at least in some embodiments, a virtual camera is defined and video image data from the array of cameras is combined such that the transmitted video image data appears as if it has been captured by the virtual camera. This may enable eye-contact to be made between the party which helps to provide a more engaging view of the party in the captured video image data to the party (or parties) at the remote location(s) that are viewing the transmitted video image data. This helps to provide a video conference experience that is more akin to a face to face meeting, thus improving the human interaction.

The invention claimed is:

1. A method of capturing data for use in a video conference, the method comprising:
   capturing data of a party at a first location using an array of one or more video cameras and/or one or more sensors;
   wherein the one or more video cameras and/or one or more sensors in the array are located in the same plane;
   wherein the field of view of the one or more video cameras and/or one or more sensors in the array is directed outwards perpendicularly to the plane in which they are located; and
   determining, for each of the one or more video cameras and/or each of the one or more sensors in the array, the three-dimensional position(s) of one or more features represented in the data captured by the video camera or sensor;
   defining a virtual camera positioned at a three-dimensional virtual camera position;
   transforming the three-dimensional position(s) determined for the feature(s) represented in the data into a common coordinate system to form a single view of the feature(s) as appearing to have been captured from the virtual camera using the video image data from the one or more video cameras and/or the data from the one or more sensors;
   transmitting and/or storing the video image and/or sensor data of the feature(s) viewed from the perspective of the virtual camera and/or data representative of the transformed three-dimensional position(s) of the feature(s); and
   wherein the method further comprises determining a depth component of the three-dimensional position(s) of the feature(s) and transforming the image data and/or the sensor data of the feature(s) into the common coordinate system using an xy translation inversely proportional to the determined depth of the feature(s).

2. The method as claimed in claim 1, further comprising selecting the feature(s) in the video image and/or sensor data having transformed three-dimensional position(s) in the common coordinate system that are within a particular range of three-dimensional positions.

3. The method as claimed in claim 1, wherein a depth component of the three-dimensional position(s) of the feature(s) is determined by triangulating the positions of the feature(s) using the video image data from the video camera(s) and/or the sensor data from the sensor(s).

4. The method as claimed in claim 1, wherein the method comprises calibrating the positions of the video camera(s) and/or sensor(s) in the array of video camera(s) and/or sensor(s).

5. The method as claimed in claim 1, wherein the method comprises identifying feature(s) in the video image data and/or the other sensor data captured by the array of video camera(s) and/or sensor(s).

6. The method as claimed in claim 5, wherein the step of identifying feature(s) in the video image data or other sensor data comprises identifying feature(s) in one or more blocks of the video image data and/or the other sensor data.

7. The method as claimed in claim 1, wherein the method comprises identifying participant(s) of the first party in the video image and/or sensor data captured by the array of video camera(s) and/or sensor(s).

8. The method as claimed in claim 7, wherein the virtual camera is positioned using the participant(s) of the first party identified in the captured video image and/or sensor data and/or the direction in which the participant(s) are looking or facing.

9. The method as claimed in claim 5, wherein the method comprises comparing one or more identified features or participants in the video image data and/or other sensor data from one of the video camera(s) and/or sensor(s) in the array with one or more identified features or participants in the video image data and/or other sensor data from other(s) of the video camera(s) and/or sensor(s) in the array, and matching the same or similar identified features or participants with each other.

10. The method as claimed in claim 9, wherein the method comprises matching the video image data and/or other sensor data from one or more pairs of video camera(s) and/or sensor(s) in the array.

11. The method as claimed in claim 9, wherein the method comprises forming a depth map, a 3D point cloud, a 3D mesh or a depth buffer for each pair of video camera(s) and/or sensor(s) in the array between which identified feature(s) have been matched and storing the determined three-dimensional position(s) of the identified and matched feature(s) in the depth map, 3D point cloud, 3D mesh or depth buffer.

12. The method as claimed in claim 9, wherein the method comprises using the video image data and/or sensor data from other(s) of the video camera(s) and/or sensor(s) in the array to refine the three-dimensional position(s) of the identified and matched feature(s).

13. The method as claimed in claim 1, the method further comprising defining a plurality of virtual cameras positioned at respective three-dimensional virtual camera positions.

14. The method as claimed in claim 1, the method further comprising filling a depth buffer with a transformed depth position of each of the features represented in the video image and/or sensor data.

15. The method as claimed in claim 1, wherein the single view of the feature(s) is formed such that the face(s) and/or eye(s) and/or body of the participant(s) in the video image and/or data are oriented perpendicularly to the direction to them from the virtual camera.

16. The method as claimed in claim 1, wherein the video image and/or sensor data from the array of video camera(s) and/or sensor(s) of the selected feature(s) are combined by forming a triangulated mesh, point cloud or depth buffer of the feature(s); and wherein the triangulated mesh, point cloud or depth buffer of the selected feature(s) is filled with image and/or sensor data of the selected feature(s) from the video camera(s) and/or sensor(s) in the array.

17. The method as claimed in claim 1, wherein the method comprises combining the video image data from the one or more video cameras and/or the data captured by the one or more sensors to form the single view of the feature(s) as appearing to have been captured from the virtual camera; and wherein the method comprises averaging the colour data from the one or more video cameras and/or the data captured by the one or more sensors to form the single view of the feature(s) as appearing to have been captured from the virtual camera.

18. A video conferencing system for capturing data for use in a video conference, the system comprising:
an array of one or more video cameras and/or one or more sensors for capturing data of a party at a first location;
wherein the one or more video cameras and/or one or more sensors in the array are located in the same plane;
wherein the field of view of the one or more video cameras and/or one or more sensors in the array is directed outwards perpendicularly to the plane in which they are located; and
processing circuitry configured to:
  determine, for each of the one or more video cameras and/or each of the one or more sensors in the array, the three-dimensional position(s) of one or more features represented in the data captured by the video camera or sensor;
  define a virtual camera positioned at a three-dimensional virtual camera position;
  transform the three-dimensional position(s) determined for the feature(s) represented in the data into a common coordinate system to form a single view of the feature(s) as appearing to have been captured from the virtual camera using the video image data from the one or more video cameras and/or the data from the one or more sensors; and
  transmit and/or store the video image and/or sensor data of the feature(s) as viewed from the perspective of the virtual camera(s) and/or data representative of the transformed three-dimensional position(s) of the feature(s); and
wherein the processing circuitry is further configured to determine a depth component of the three-dimensional position(s) of the feature(s) and transform the image data and/or sensor data of the feature(s) into the common coordinate system using an xy translation inversely proportional to the determined depth of the feature(s).

19. A non-transitory computer readable storage medium storing computer software code which when executing on a data processing system performs a method of capturing data for use in a video conference, the method comprising:
determining, for each of one or more video cameras and/or one or more sensors in an array, the three-dimensional position(s) of one or more features represented in data of a party at a first location captured by the video camera or sensor;
wherein the one or more video cameras and/or one or more sensors in the array are located in the same plane;
wherein the field of view of the one or more video cameras and/or one or more sensors in the array is directed outwards perpendicularly to the plane in which they are located; and
defining a virtual camera positioned at a three-dimensional virtual camera position;
transforming the three-dimensional position(s) determined for the feature(s) represented in the data into a common coordinate system to form a single view of the feature(s) as appearing to have been captured from the virtual camera using the video image data from the one or more video cameras and/or the data from the one or more sensors;
transmitting and/or storing the video image and/or sensor data of the feature(s) viewed from the perspective of the virtual camera and/or data representative of the transformed three-dimensional position(s) of the feature(s) and;
wherein the method further comprises determining a depth component of the three-dimensional position(s) of the feature(s) and transforming the image data and/or the sensor data of the feature(s) into the common coordinate system using an xy translation inversely proportional to the determined depth of the feature(s).

* * * * *